March 30, 1948.   J. W. HUGHES   2,438,750
HOSE COUPLING
Filed April 27, 1945
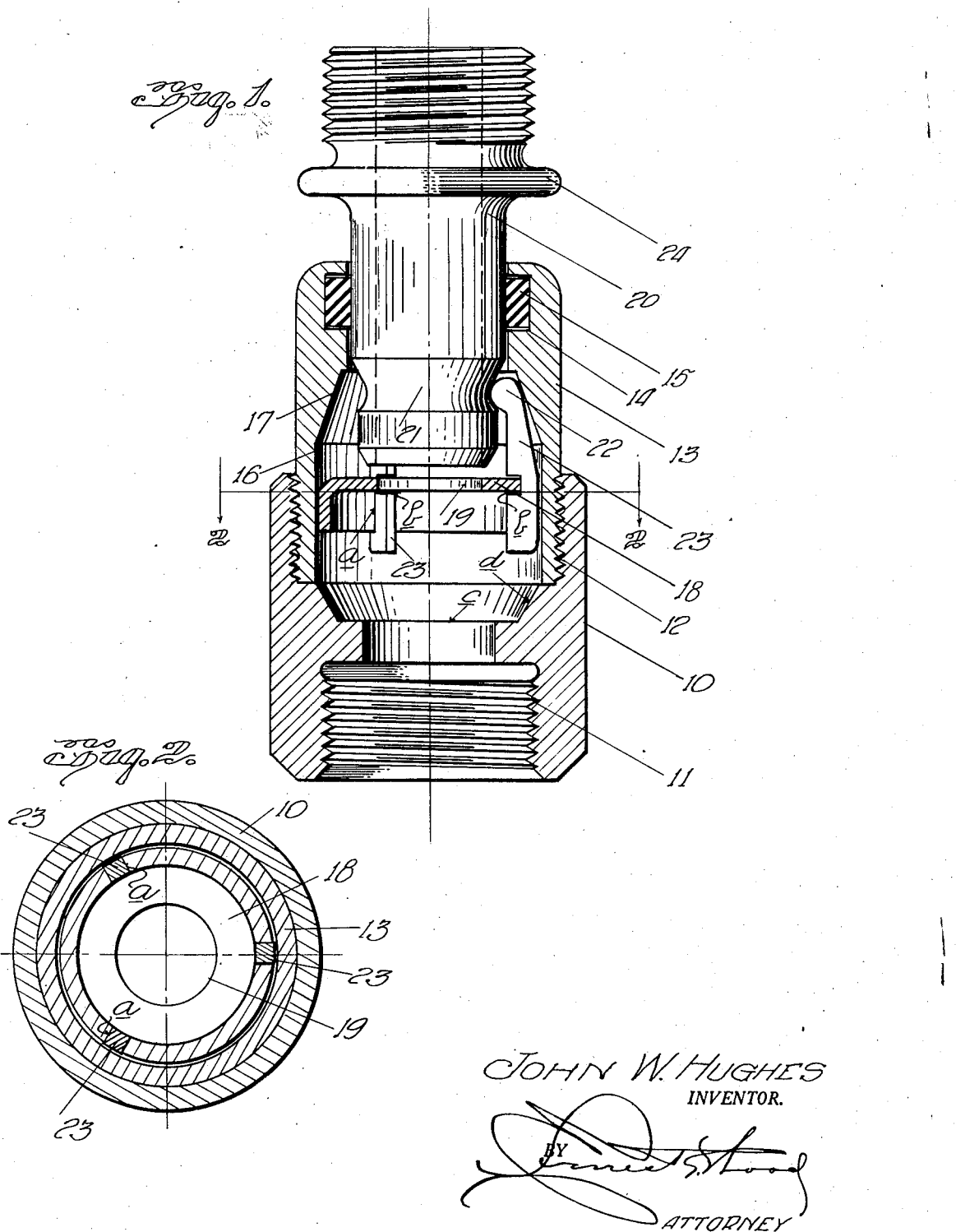
JOHN W. HUGHES
INVENTOR.
BY
ATTORNEY Patented Mar. 30, 1948

2,438,750

UNITED STATES PATENT OFFICE 2,438,750

HOSE COUPLING

John W. Hughes, Dallas, Tex.

Application April 27, 1945, Serial No. 590,575

5 Claims. (Cl. 285—170)

This invention relates to hose couplings and more particularly to hose attachments for water faucets, although capable of other uses.

The principal object of the invention is to provide a coupling by which a hose may be quickly attached to a water faucet or hydrant, supplanting the more cumbersome and time consuming methods of threading or interlocking the coupling elements together. It is the intent of the present invention to provide a leakproof coupling by which a hose may be attached to a source of air or liquid supply by the simple expedient of thrusting a specially constructed end of a hose longitudinally into a specially constructed socket, the latter containing pressure actuated clamping means resisting displacement of the hose end and packing means for sealing the orifice in the socket through which the latter is inserted.

It is a further object of the invention to include the hose receiving socket in a specially designed outlet from an air or liquid supply, whether this be a water faucet, hydrant, tap or coupling whereby a connection may be made by the simple expedient of inserting the complementary nipple thereinto.

With the foregoing objects paramount, the invention has further reference to certain features of accomplishment which will become apparent as the description proceeds, taken in connection with the accompanying drawings wherein:

Figure 1 is a view in vertical section of a hose coupling constructed according to the present invention, and Figure 2 is a view in transverse section, taken on line 2—2 on Figure 1.

Continuing with a more detailed description of the drawing, reference numeral 10 denotes a sleeve, threaded internally at 11 to receive the threaded spout of a water faucet or the threaded nipple of a section of hose or pipe, as the case may be. The opposite end of this sleeve is also internally threaded at 12 to receive one end of a socket 13, as shown.

The socket 13 has an annular, undercut recess in its opposite end which contains a rubber packing washer 15. The interior of the socket 13 is formed with a cavity 16, one end of which has converging walls 17, for the purpose to be presently explained. The remaining portion of the cavity 16 is straight walled and affords a bearing surface for a longitudinally slidable cup 18. This cup has a central opening 19 therein for the passage of fluid.

A nipple 20 is insertable into the open end of the socket 13, past the annular packing 15 and, adjacent the end of this nipple there is provided an annular recess 21, concave in transverse section. Lying in this recess are the correspondingly shaped free ends 22 of a series of fingers 23, spaced circumferentially about the cup 18 and held against longitudinal displacement with respect thereto by virtue of slots a in the skirt of the cup in which the fingers repose. However, the fingers are each recessed at b to receive the edge of the cup exposed by the slots a and the recesses b are of such length that the fingers will be capable of limited rocking motion with the said edges at the fulcrum point.

The fixture 10 is first threaded onto a faucet or the like, after which the socket 13 is threaded into the fixture. The nipple 20 is then inserted into the socket 13, the flange 24 affording a stop therefor. It is intended that the air or liquid passing into the socket through the fixture or sleeve 10, such as the normal pressure of municipal tap water, be effective to actuate the cup and the fingers 23 to lock the nipple 20 in the socket as long as the pressure exists in the socket. In inserting the nipple 20, the cup 18 is moved thereby in the socket until the ends of the fingers 23 engage the shoulder c in the sleeve 10.

As soon as fluid under pressure is released into the cavity of the socket 13, the cup 18 is propelled towards the coniform end of the cavity, forcing the nipple outwardly until the ends 22 of the fingers 18 are constrained by the converging walls 17 to move inwardly into engagement with the annular recess 21 of the nipple 20, thus holding the latter against further displacement by the fluid pressure. Such pressure is also effective to compress the packing 15 about the nipple 20, thereby preventing leakage between the latter and the socket 13.

When pressure in the socket 13 is relieved, as by closing a water faucet, the nipple 20 is removed from the socket by forcing it farther into the socket to bring the lower ends of the fingers into engagement with the shoulder c which they do only after engagement with the inclined walls d converging towards the said shoulder c and which are effective to expand the upper ends of the fingers, out of engagement with the recess 21 of the nipple. The nipple may then be freely withdrawn from the socket.

Manifestly, the construction as shown and described is capable of some modification and such modification as may be construed to fall within the scope and meaning of the appended claims is also considered to be within the spirit and intent of the invention.

What is claimed is:

1. A hose coupling including a fixture sleeve and a socket removably mounted therein having an internal cavity provided with converging walls at one end, a cup conforming to and slidable in said cavity having peripheral slots, fingers rockably mounted in said slots having ends engageable with and collapsible by the converging walls of said cavity, a hose nipple adapted for insertion into said socket to force said cup towards the opposite end of said cavity and having an annular recess therein adjacent its end, said cup being effective upon release of fluid pressure into said sleeve to propel said nipple in a counter-direction to collapse said fingers into the annular recess of said nipple, means effective upon relieving said pressure to retract said fingers and means for sealing said socket against pressure leakage past said nipple.

2. A hose coupling comprising a socket member attachable to a source of fluid supply, having a cylindrical cavity tapered at one end, a centrally apertured cup slidable in said cavity, fingers spaced about and movable with said cup and constrained against other than rocking movement with respect thereto, adapted to be collectively moved inwardly at their upper ends upon engagement with the tapered end of said cavity, a hose nipple insertable into said socket having an annular recess adjacent its end and effective to move said cup inwardly towards one end of said cavity, said cup, upon introduction of fluid pressure into said socket, being effective thereby to thrust said nipple outwardly to move said fingers against the taper of said cavity wall, collapsing them into the recess of said nipple to hold the same against displacement and means for sealing said socket.

3. A hose coupling including a socket attachable to a fluid source having a cavity provided with a tapered end, an annular grooved nipple adapted for insertion into said socket, a cup slidable in said cavity in one direction by said nipple and in the opposite direction by fluid under pressure released into said socket, fingers carried by said slidable means, engageable with the taper of said cavity upon pressure actuation of said slidable means, to be forced thereby into engagement with the annular groove of said nipple to hold the same against displacement from said socket and means for sealing said socket.

4. A hose coupling including an interiorly tapered socket and an annularly grooved nipple receivable therein, a fluid pressure responsive cup slidably mounted in said socket, effective to propel said nipple longitudinally in said socket under pressure introduced into the latter, a plurality of fingers circumferentially spaced about said slidable cup and rockably mounted thereon for engagement with and contraction by the taper of said socket into the annular groove of said nipple for clamping the same operatively in said socket, and means for sealing said socket against leakage of fluid.

5. A hose coupling including complementary socket and nipple members, said socket having a cavity therein provided with a tapered end, a fluid pressure actuated cup within said cavity, engageable with said nipple to force the same towards the tapered end of said cavity, and a plurality of fingers oscillatably mounted on the perimeter of said cup and constrained by said taper to move into a position to clampingly engage said nipple to hold the same against further displacement by fluid pressure with respect to said socket.

JOHN W. HUGHES.

REFERENCES CITED

The following references are of record in the file of this patent:

UNITED STATES PATENTS

| Number | Name | Date |
|---|---|---|
| 2,056,249 | Bystricky | Oct. 6, 1936 |
| 2,263,850 | Nielsen | Nov. 25, 1941 |